United States Patent
Root

(10) Patent No.: US 6,748,621 B1
(45) Date of Patent: Jun. 15, 2004

(54) VEHICLE WINDSHIELD WIPER ASSEMBLY

(76) Inventor: Ricky L. Root, P.O. Box 1985, Dillon, CO (US) 80435

( * ) Notice: Subject to any disclaimer, the term of this patent is extended or adjusted under 35 U.S.C. 154(b) by 76 days.

(21) Appl. No.: 10/164,803

(22) Filed: Jun. 7, 2002

(51) Int. Cl.$^7$ ................................................. B60S 1/38
(52) U.S. Cl. ................ 15/250.41; 15/250.4; 15/250.46; 15/250.48
(58) Field of Search ............................ 15/250.4, 250.41, 15/250.48, 250.46, 250.44, 250.451, 250.452, 250.453, 250.454

(56) References Cited

U.S. PATENT DOCUMENTS

| | | | | |
|---|---|---|---|---|
| 2,013,200 A | * | 9/1935 | Conway | 15/250.02 |
| 2,085,608 A | * | 6/1937 | Rodrick | 15/250.03 |
| 2,601,664 A | * | 6/1952 | Nesson | 15/250.03 |
| 2,727,270 A | * | 12/1955 | Bosso | 15/250.43 |
| 3,372,423 A | * | 3/1968 | Andersen | 15/250.43 |
| 3,631,561 A | * | 1/1972 | Aszkenas | 15/250.41 |
| 4,103,384 A | * | 8/1978 | Priesemuth | 15/250.03 |
| 4,180,885 A | * | 1/1980 | Thornton et al. | 15/250.32 |
| 5,235,720 A | * | 8/1993 | Kinder | 15/250.4 |
| 5,301,384 A | | 4/1994 | Perry | |
| D349,082 S | | 7/1994 | Brabender | |
| 5,406,672 A | * | 4/1995 | Hipke | 15/250.41 |
| 5,442,834 A | | 8/1995 | Perry | |
| 5,778,483 A | | 7/1998 | Dawson | |

FOREIGN PATENT DOCUMENTS

| | | | | |
|---|---|---|---|---|
| DE | 1045263 | * | 11/1958 | 15/250.48 |
| GB | 968300 | * | 9/1964 | 15/250.451 |
| GB | 2124477 | * | 2/1984 | 15/250.41 |
| GB | 2220843 | * | 1/1990 | 15/250.46 |

* cited by examiner

Primary Examiner—Gary K. Graham

(57) ABSTRACT

A vehicle windshield wiper assembly for providing a user with a set of windshield wipers for motor vehicles designed to scrub insects off the glass. The vehicle windshield wiper assembly includes a bridge member that has a first end, a second end, and a medial portion. The first and second ends are for attachment to a plurality of attachment portions of a blade member. The medial portion of the bridge member is for attachment to a wiper arm of a vehicle. The blade member is for providing support to a plurality of cleaning members and a cleaning blade. The cleaning members and the cleaning blade are for facilitating cleaning of debris the windshield of a vehicle.

12 Claims, 4 Drawing Sheets

VEHICLE WINDSHIELD WIPER ASSEMBLY

BACKGROUND OF THE INVENTION

1. Field of the Invention

The present invention relates to windshield wiper assembly and more particularly pertains to a new vehicle windshield wiper assembly for providing a user with a set of windshield wipers for motor vehicles designed to scrub insects off the glass.

2. Description of the Prior Art

The use of windshield wiper assembly is known in the prior art. U.S. Pat. No. 5,406,672 describes a windshield wiper system including wiping and scrubbing blades. Another type of windshield wiper assembly is U.S. Pat. No. 5,235,720 having a windshield wiper assembly with scrubbing blade for cleaning a windshield of a vehicle. U.S. Pat. No. Des. 349,082 describes an ornamental design for a combined windshield wiper and washer. U.S. Pat. No. 5,778,483 describes a windshield wiper blade assembly with sponge and tension mechanism. U.S. Pat. No. 5,442,834 describes a windshield scrubber and blade wiping assembly. U.S. Pat. No. 5,301,384 describes windshield scrubber and blade wiping assembly

SUMMARY OF THE INVENTION

The object of the present invention is to provide at new vehicle windshield wiper assembly that would remove stubborn insect and dirt deposits that might otherwise be bypassed or smeared into the glass.

Another object of the present invention is to provide a new vehicle windshield wiper assembly that would eliminate the need to continually pull the vehicle to the roadside to manually wipe the windshield free of insect remains.

To this end, the present invention generally comprises a bridge member that has a first end, a second end, and a medial portion. The first and second ends are for attachment to a plurality of attachment portions of a blade member. The media portion of the bridge member is for attachment to a wiper arm of a vehicle. The blade member is for providing support to a plurality of cleaning members and a cleaning blade. The cleaning members and the cleaning blade are for facilitating cleaning of debris the windshield of a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
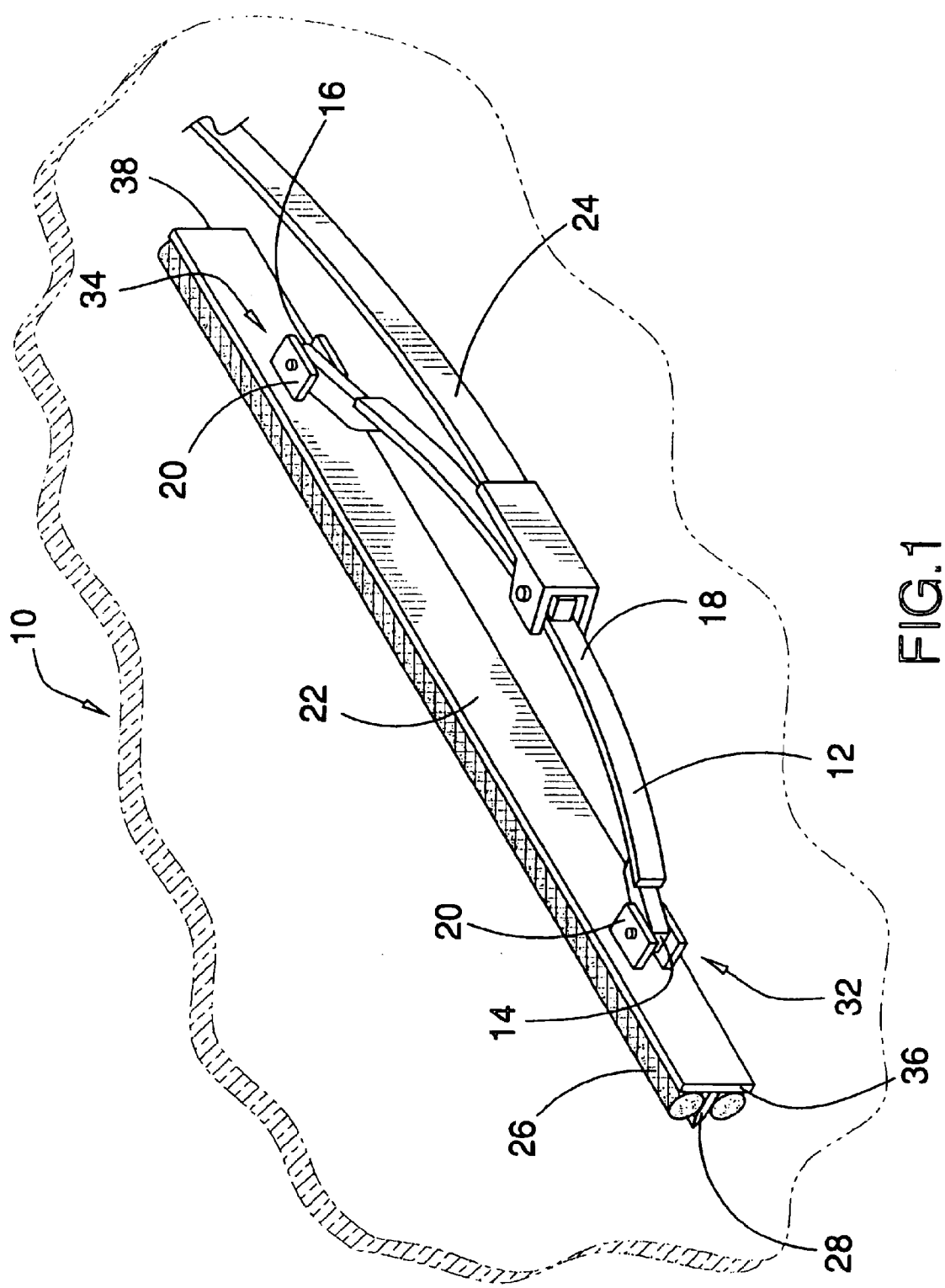
FIG. 1 is a perspective view of a new vehicle windshield wiper assembly according to the present invention.
Figure 2:
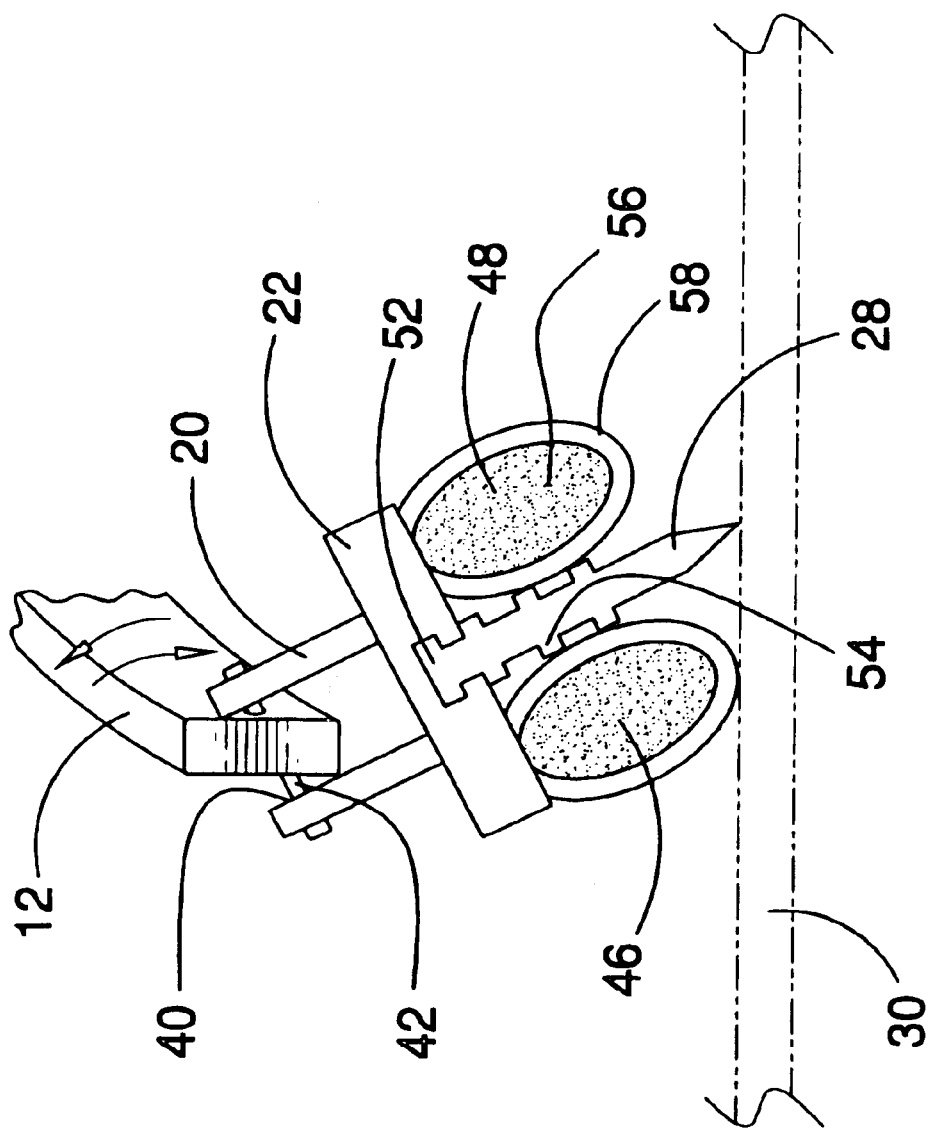
FIG. 2 is a side view of the present invention.
Figure 3:
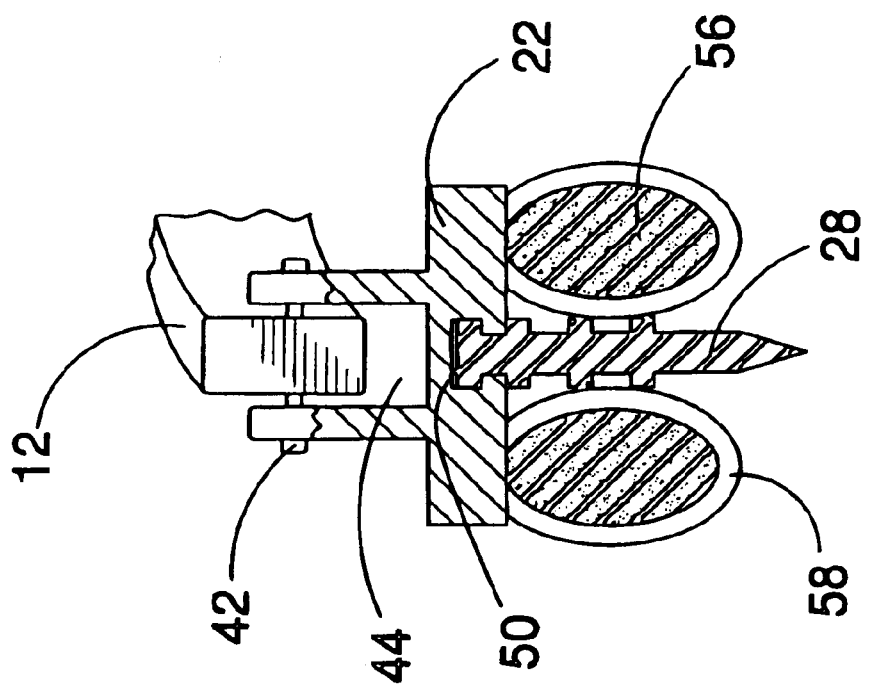
FIG. 3 is a cross-sectional view of the present invention.
Figure 4:
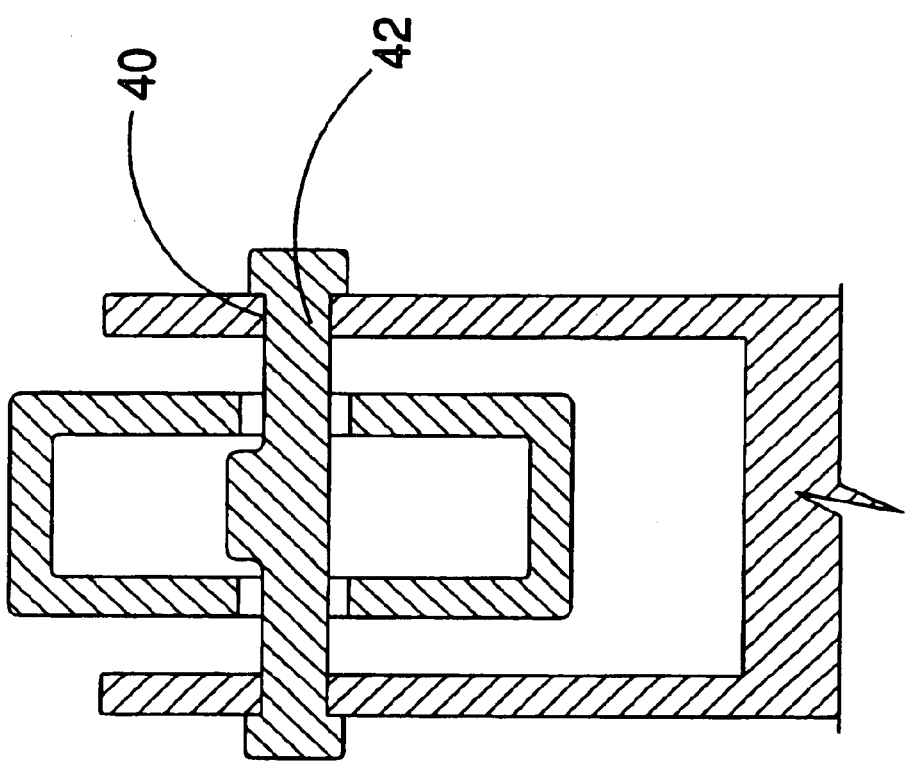
FIG. 4 is a cross-sectional view of the present invention.

With reference now to the drawings, and in particular to FIGS. 1 through 4 thereof, a new vehicle windshield wiper assembly embodying the principles and concepts of the present invention and generally designated by the reference numeral 10 will be described.

As best illustrated in FIGS. 1 through 4, the vehicle windshield wiper assembly 10 generally comprises a bridge member 12 that has a first end 14, a second end 16, and a medial portion 18. The first 14 and second 16 ends are for attachment to a plurality of attachment portions 20 of a blade member 22. The medial portion 18 of the bridge member 12 is for attachment to a wiper arm 24 of a vehicle. The blade member 22 is for providing support to a plurality of cleaning members 26 and a cleaning blade 28. The cleaning members 26 and the cleaning blade 28 are for facilitating cleaning of debris the windshield 30 of a vehicle.

The blade member 22 has a first plurality of a attachment portions 32 and a second plurality of attachment portions 34. The first plurality of attachment portions 32 is positioned near a first end 36 of the blade member 22. The first plurality of attachment portions 32 is for coupling to a first end 14 of the bridge member 12. The second plurality of attachment portions 34 is positioned near a second end 38 of the blade member 22. The second plurality of attachment portions 34 is for coupling to a second end 16 of the bridge member 12.

Each of the first plurality of attachment portions 32 and each of the second plurality of attachment portions 34 has a pair of apertures 40 extending through the first plurality of attachment portions 32 and the second plurality of attachment portions 34. Each of the apertures 40 is for receiving one of a pair of pin members 42 for facilitating attachment of the attachment portions 20 to the bridge member 12.

The first 32 and second 34 pluralities of attachment portions each have a space 44 there between. The space 44 is wider than a thickness of the first 14 and second 16 ends of the bridge member 12 for facilitating a pivoting action of the blade member 22 when the blade member 22 is moved across a vehicles windshield 30.

The pivoting action allows a first one of the cleaning members 46 to contact the vehicles windshield 30 while moving in a first direction and allows a second one of the cleaning members 48 to come in contact with the vehicles windshield 30 when moving in a second direction.

The blade member 22 has a channel 50 that extends longitudinally through a length of the blade member 22. The channel 50 is for receiving an attachment portion 52 of the cleaning blade 28. The cleaning blade 28 has a plurality of protrusions 54 extending outwardly from the sides of the cleaning blade 28. The protrusions 54 are for stabilizing the cleaning blade 28 between the plurality of the cleaning members 26.

The cleaning members 26 have a foam portion 56 and a mesh portion 58. The foam portion 56 is for absorbing an amount of cleaning fluid to aid in cleaning debris from the windshield 30. The mesh portion 58 envelopes the foam portion 56 for aiding in the scrubbing debris from the windshield 30 of the vehicle.

In use, a user would install and use the present invention similarly to a set of conventional wiper blade assemblies.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle windshield wiper assembly for use in cleaning debris from a windshield of a vehicle comprising:
   a bridge member having a first end, a second end, and a medial portion, said first and second ends being attached to a plurality of attachment portions of a blade member, said medial portion of said bridge member being attached to a wiper arm of a vehicle;
   said blade member supporting a plurality of cleaning members and a cleaning blade, said cleaning members and said cleaning blade being for facilitating cleaning of debris from the windshield of a vehicle; and
   wherein said cleaning blade has a plurality of protrusions extending outwardly from each side thereof toward said cleaning members, said protrusions stabilizing said cleaning blade between said plurality of said cleaning members by contact therewith.

2. The assembly of claim 1, wherein said blade member has a first plurality of attachment portions and a second plurality of attachment portions, said first plurality of attachment portions positioned near a first end of said blade member, said first plurality of attachment portions being for coupling to a first end of said bridge member, said second plurality of attachment portions being positioned near a second end of said blade member, said second plurality of attachment portions being for coupling to a second end of said bridge member.

3. The assembly of claim 2, wherein each of said first plurality of attachment portions and each of said second plurality of attachment portions has a pair of apertures extending through said first plurality of attachment portions and said second plurality of attachment portions, each of said apertures being for receiving one of a pair of pin members for facilitating attachment of said attachment portions to said bridge member.

4. The assembly of claim 2, wherein said first and second pluralities of attachment portions each have a space there between, said space being wider than a thickness of said first and second ends of said bridge member for facilitating a pivoting action of said blade member when said blade member is moved across a vehicles windshield, the pivoting action allows a first one of said cleaning members to contact the vehicles windshield while moving in a first direction and allows a second one of said cleaning members to come in contact with the vehicles windshield when moving in a second direction.

5. The assembly of claim 1, wherein said blade member has a channel that extending longitudinally through a length of said blade member, said channel being for receiving an attachment portion of said cleaning blade.

6. The assembly of claim 1, wherein said cleaning members have a foam portion and a mesh portion, said foam portion being for absorbing an amount of cleaning fluid to aid in cleaning debris from the windshield, said mesh portion enveloping said foam portion for aiding in the scrubbing debris from the windshield of the vehicle.

7. A vehicle windshield wiper assembly for use in cleaning debris from a windshield of a vehicle comprising:
   a bridge member having a first end, a second end, and a medial portion, said first and second ends being attached to a plurality of attachment portions of a blade member, said medial portion of said bridge member being attached to a wiper arm of a vehicle;
   said blade member supporting a plurality of cleaning members and a cleaning blade, said cleaning members and said cleaning blade being for facilitating cleaning of debris from the windshield of a vehicle
   wherein said blade member has a first plurality of attachment portions and a second plurality of attachment portions, said first plurality of attachment portions positioned near a first end of said blade member, said first plurality of attachment portions being for coupling to a first end of said bridge member, said second plurality of attachment portions being positioned near a second end of said blade member, said second plurality of attachment portions being for coupling to a second end of said bridge member;
   wherein each of said first plurality of attachment portions and each of said second plurality of attachment portions has a pair of apertures extending through said first plurality of attachment portions and said second plurality of attachment portions, each of said apertures being for receiving one of a pair of pin members for facilitating attachment of said attachment portions to said bridge member;
   wherein said first and second pluralities of attachment portions each have a space there between, said space being wider than a thickness of said first and second ends of said bridge member for facilitating a pivoting action of said blade member when said blade member is moved across a vehicles windshield, the pivoting action allows a first one of said cleaning members to contact the vehicles windshield while moving in a first direction and allows a second one of said cleaning members to come in contact with the vehicles windshield when moving in a second direction;
   wherein said blade member has a channel that extending longitudinally through a length of said blade member, said channel being for receiving an attachment portion of said cleaning blade;
   wherein said cleaning blade has a plurality of protrusions extending outwardly from the sides of said cleaning member, said protrusions being for stabilizing said cleaning blade between said plurality of said cleaning members; and
   wherein said cleaning members have a foam portion and a mesh portion, said foam portion being for absorbing an amount of cleaning fluid to aid in cleaning debris from the windshield, said mesh portion enveloping said foam portion for aiding in the scrubbing debris from the windshield of the vehicle.

8. A vehicle windshield wiper assembly for use in cleaning debris from a windshield of a vehicle comprising:
   a bridge member having a first end, a second end, and a medial portion, said first and second ends attached to a plurality of attachment portions of a blade member, said medial portion of said bridge member being attached to a wiper arm of a vehicle;
   said blade member supporting a plurality of cleaning members and a cleaning blade, said cleaning members and said cleaning blade being for facilitating cleaning of debris from the windshield of a vehicle;

wherein said blade member has a first plurality of attachment portions and a second plurality of attachment portions, said first plurality of attachment portions positioned near a first end of said blade member, said first plurality of attachment portions being for coupling to a first end of said bridge member, said second plurality of attachment portions being positioned near a second end of said blade member, said second plurality of attachment portions being for coupling to a second end of said bridge member; and wherein said first and second pluralities of attachment portions each have a space there between, said space being wider than a thickness of said first and second ends of said bridge member for facilitating a pivoting action of said blade member when said blade member is moved across a vehicles windshield, the pivoting action allows a first one of said cleaning members to contact the vehicles windshield while moving in a first direction and allows a second one of said cleaning members to come in contact with the vehicles windshield when moving in a second direction.

9. The assembly of claim 8, wherein each of said first plurality of attachment portions and each of said second plurality of attachment portions has a pair of apertures extending through said first plurality of attachment portions and said second plurality of attachment portions, each of said apertures being for receiving one of a pair of pin members for facilitating attachment of said attachment portions to said bridge member.

10. The assembly of claim 8, wherein said blade member has a channel that extending longitudinally through a length of said blade member, said channel being for receiving an attachment portion of said cleaning blade.

11. The assembly of claim 8, wherein said cleaning blade has a plurality of protrusions extending outwardly from the sides of said cleaning member, said protrusions being for stabilizing said cleaning blade between said plurality of said cleaning members.

12. The assembly of claim 8, wherein said cleaning members have a foam portion and a mesh portion, said foam portion being for absorbing an amount of cleaning fluid to aid in cleaning debris from the windshield, said mesh portion enveloping said foam portion for aiding in the scrubbing debris from the windshield of the vehicle.

* * * * *